(12) United States Patent
Gu et al.

(10) Patent No.: US 12,462,882 B2
(45) Date of Patent: Nov. 4, 2025

(54) SEMICONDUCTOR MEMORY INCLUDING A CURRENT COMPARISON READOUT CIRCUIT

(71) Applicant: CSMC TECHNOLOGIES FAB2 CO., LTD., Jiangsu (CN)

(72) Inventors: Ming Gu, Wuxi (CN); Hao Wang, Wuxi (CN); Shuming Guo, Wuxi (CN); Youhui Li, Wuxi (CN); Bin Chen, Wuxi (CN); Yongqiang Hu, Wuxi (CN)

(73) Assignee: CSMC TECHNOLOGIES FAB2 CO., LTD., Jiangsu (CN)

( * ) Notice: Subject to any disclaimer, the term of this patent is extended or adjusted under 35 U.S.C. 154(b) by 414 days.

(21) Appl. No.: 17/928,333

(22) PCT Filed: Apr. 27, 2021

(86) PCT No.: PCT/CN2021/090083
§ 371 (c)(1),
(2) Date: Nov. 29, 2022

(87) PCT Pub. No.: WO2022/110636
PCT Pub. Date: Jun. 2, 2022

(65) Prior Publication Data
US 2023/0215503 A1 Jul. 6, 2023

(30) Foreign Application Priority Data
Nov. 30, 2020 (CN) .......................... 202011374365.2

(51) Int. Cl.
*G11C 16/28* (2006.01)
*G11C 16/08* (2006.01)
*G11C 16/30* (2006.01)

(52) U.S. Cl.
CPC .............. *G11C 16/28* (2013.01); *G11C 16/08* (2013.01); *G11C 16/30* (2013.01)

(58) Field of Classification Search
CPC ......... G11C 16/28; G11C 16/08; G11C 16/30; G11C 16/0433; G11C 16/24; Y02D 10/00
See application file for complete search history.

(56) References Cited

U.S. PATENT DOCUMENTS

| 7,388,798 B2 * | 6/2008 | Kim ........................ G11C 7/18 365/210.1 |
| 9,997,211 B2 * | 6/2018 | Ahn ....................... G11C 7/067 |
| 2015/0270006 A1 * | 9/2015 | Yoo .......................... G11C 7/04 365/185.21 |

FOREIGN PATENT DOCUMENTS

| CN | 101026004 A | 8/2007 |
| CN | 101425329 | 5/2009 |

(Continued)

OTHER PUBLICATIONS

Chinese Office Action for corresponding Chinese Application No. 202011374365.2, dated Jan. 31, 2023, 7 pages.

(Continued)

*Primary Examiner* — Amir Zarabian
*Assistant Examiner* — Bradley S Coon
(74) *Attorney, Agent, or Firm* — Dority & Manning, PA

(57) ABSTRACT

A semiconductor memory comprising: a comparison readout circuit comprising a first port configured to receive an electric signal of a read memory unit and a second port configured to receive a reference electric signal, the comparison readout circuit being configured to compare the electric signal of the read memory unit with the reference electric signal to obtain storage information of the memory unit; and a first/second column decoder connected to a first/second memory array and the comparison readout circuit and configured to select a bitline corresponding to the read memory unit when a memory array selection signal enables the first/second memory array, and output the electric signal of the memory unit to the first port by means of (Continued)

the bitline, and further configured to connect a first bitline of the first/second memory array to the second port when the memory array selection signal does not enable the first/second memory array.

13 Claims, 5 Drawing Sheets

(56) References Cited

FOREIGN PATENT DOCUMENTS

| | | |
|---|---|---|
| CN | 102456405 | 5/2012 |
| CN | 103065668 | 4/2013 |
| CN | 104715781 A | 6/2015 |
| CN | 105378841 A | 3/2016 |
| CN | 107403634 A | 11/2017 |
| CN | 107516544 | 12/2017 |
| CN | 107591181 A | 1/2018 |
| JP | 2016177859 | 10/2016 |

OTHER PUBLICATIONS

PCT International Search Report and Written Opinion (w/ English translation) for corresponding PCT Application No. PCT/CN2021/090083, mailed on Aug. 26, 2021, 8 pages.

* cited by examiner

SEMICONDUCTOR MEMORY INCLUDING A CURRENT COMPARISON READOUT CIRCUIT

CROSS-REFERENCES TO RELATED APPLICATIONS

This application is a US national phase application of International Application No. PCT/CN2021/090083, filed Apr. 27, 2021, which, in turn, claims priority to Chinese Patent Application No. 2020113743652, entitled "SEMICONDUCTOR MEMORY" and filed with the Chinese Patent Office on Nov. 30, 2020, the entire contents of both of which are incorporated herein by reference in their entirety for all purposes.

TECHNICAL FIELD

The present disclosure relates to information storage, and in particular, to a semiconductor memory.

BACKGROUND

The statements herein merely provide background information related to the present application and do not necessarily constitute a prior art.

With an increasing data throughput and low system power consumption, a system-on-chip (SOC) has a growing demand for memory. It is predicted that by 2025, about 90% of an area of a silicon chip will be occupied by memories with different functions, and an embedded memory will become a decisive factor dominating the whole system. A non-volatile memory (such as an eflash memory) is increasingly becoming an indispensable part of the embedded memory due to the characteristic of not losing data during power failure. With the continuous improvement of technological levels, the performance of the eflash memory is increasingly becoming a key indicator of the SOC, and a demand for a data bit width is increasing, which puts forward higher and higher requirements for read operation power consumption of the eflash memory. Therefore, it is of great practical significance to optimize the read operation power consumption.

SUMMARY

Based on the above, there is a need to provide a semiconductor memory with low power consumption.

A semiconductor memory is provided, including: a first memory array including a plurality of memory cells; a second memory array including a plurality of memory cells; a comparison readout circuit including a first port and a second port, the first port being configured to receive an electrical signal of a read memory cell, the second port being configured to receive a reference electrical signal, the comparison readout circuit being configured to compare the electrical signal of the read memory cell with the reference electrical signal, so as to obtain storage information of the read memory cell; a first column decoder coupled to the first memory array and the comparison readout circuit, configured to select a bitline (BL) corresponding to the read memory cell when a memory array selection signal enables the first memory array, and output the electrical signal of the memory cell to the first port through the BL; and further configured to couple a first BL of the first memory array to the second port when the memory array selection signal does not enable the first memory array; and a second column decoder coupled to the second memory array and the comparison readout circuit, configured to select a BL corresponding to the read memory cell when the memory array selection signal enables the second memory array, and output the electrical signal of the memory cell to the first port through the BL, and further configured to couple a second BL of the second memory array to the second port when the memory array selection signal does not enable the second memory array.

Details of one or more embodiments of the present application are set forth in the following accompanying drawings and descriptions. Other features, objectives, and advantages of the present application become obvious with reference to the specification, the accompanying drawings, and the claims.

BRIEF DESCRIPTION OF THE DRAWINGS

In order to better describe and illustrate embodiments and/or examples of the disclosure, reference may be made to one or more accompanying drawings. Additional details or examples used to describe the accompanying drawings should not be considered as limitations on the scope of any of the disclosed inventions, the presently described embodiments and/or examples, and the presently understood best mode of these inventions.

DETAILED DESCRIPTION OF THE EMBODIMENTS

Figure 1:
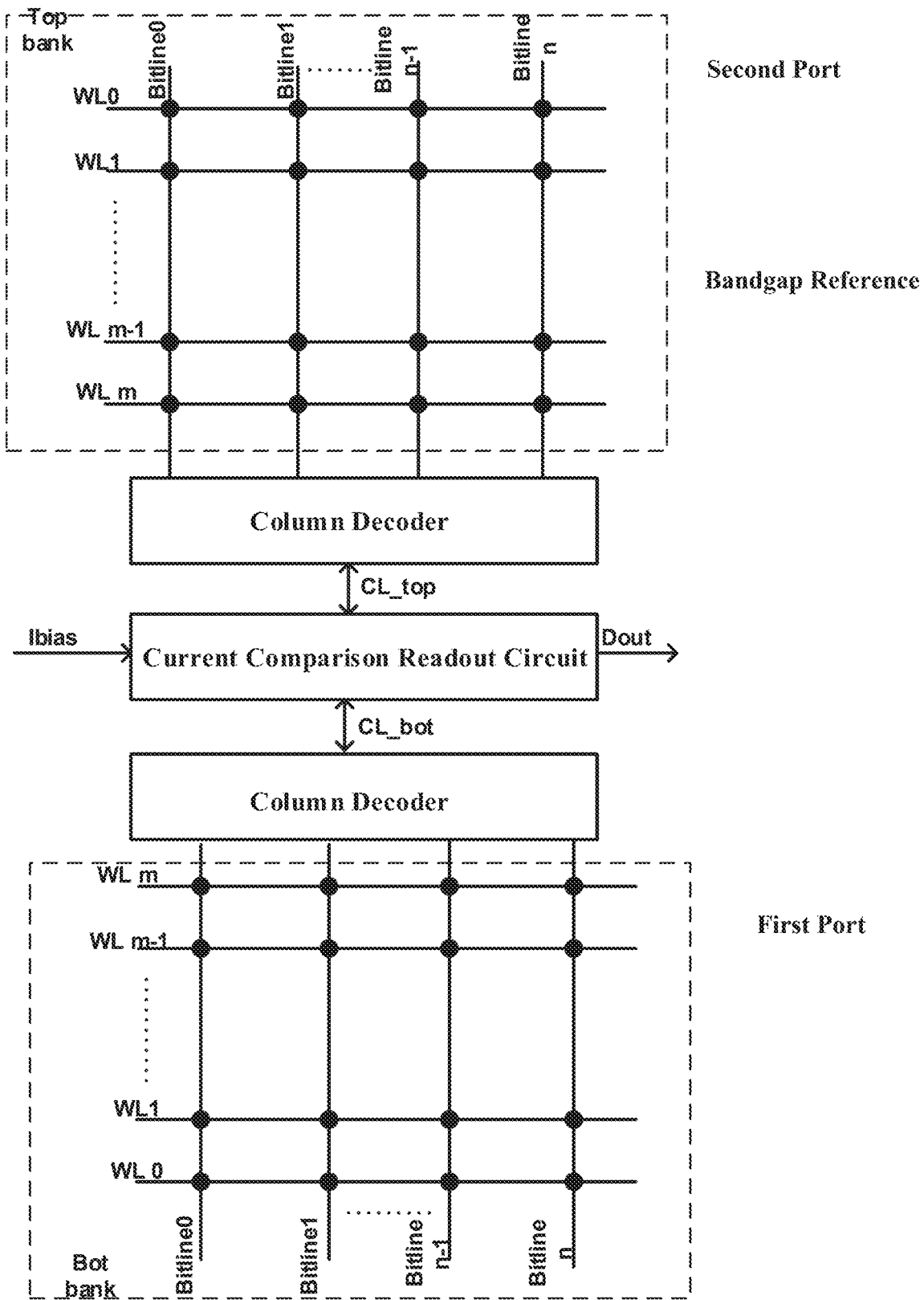
FIG. 1 is a schematic structural diagram illustrating an example semiconductor memory.

In order to make the objectives, technical solutions and advantages of the present disclosure clearer, the present disclosure is described in further detail below with reference to the accompanying drawings and embodiments. It should be understood that specific embodiments described herein are intended only to interpret the present disclosure and not intended to limit the present disclosure.

Unless defined otherwise, all technical and scientific terms used herein have the same meanings as would generally be understood by those skilled in the technical field of the present disclosure. The terms used herein in the specification of the present disclosure are for the purpose of describing specific embodiments only, and are not intended to limit the present disclosure. The term "and/or" used herein includes any and all combinations of one or more related listed items.

It should be noted that when one element is referred to as "fixed to" another element, it may be directly disposed on the another element or an intermediate element may exist. When one element is considered to be "coupled to" another element, it may be directly coupled to the another element or an intermediate element may co-exist. The terms "vertical", "horizontal", "upper", "lower", "left", "right" and similar expressions used herein are for illustrative purposes only. When an element or layer is referred to as being "on", "adjacent to", "coupled to", or "coupled to" another element or layer, the element or layer may be directly on, adjacent to, coupled to, or coupled to the another element or layer, or an intervening element or layer may be disposed therebetween. On the contrary, when an element is referred to as being "directly on", "directly adjacent to", "directly coupled to", or "directly coupled to" another element or layer, no intervening element or layer may be disposed therebetween. It should be understood that although terms such as first, second, and third may be used to describe various elements, components, regions, layers, and/or portions, the elements, components, regions, layers, and/or portions may not be limited to such terms. Such terms are used only to distinguish one element, component, region, layer, or portion from another element, component, region, layer, or portion. Thus, without departing from the teaching of the present disclosure, a first element, component, region, layer, or portion may be referred to as a second element, component, region, layer, or portion.

The term "include" used in the specification specify the presence of the features, integers, steps, operations, elements, and/or components, but may not exclude the presence or addition of one or more of other features, integers, steps, operations, components, and/or their combinations. The singular forms "a/an", "one", and "the" are also intended to include plural forms, unless otherwise clearly specified by the context.

Herein, a high level refers to a high voltage relative to a low level. In a digital logic circuit, the low level is represented as 0 and the high level as 1. For example, the low level may be 0 to 0.5 V, and the high level may be 2 to 5 V.

Figure 2:
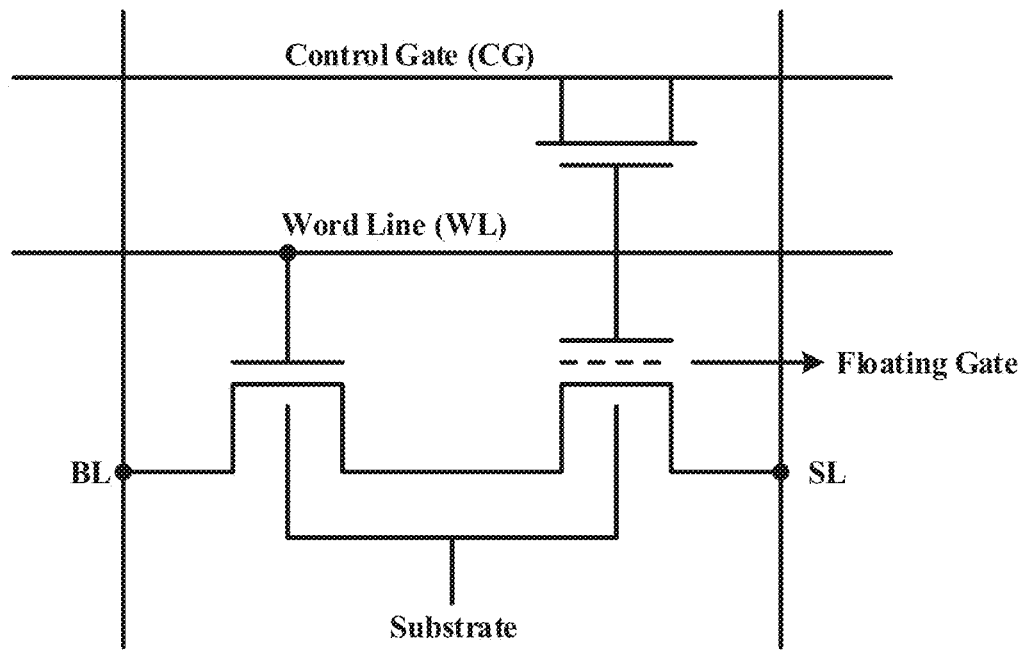
FIG. 2 is a schematic diagram illustrating a circuit structure of a memory cell according to an embodiment.

FIG. 1 is a schematic structural diagram illustrating an example semiconductor memory. Specifically, the semiconductor memory may be a flash memory, for example, an eflash memory. The semiconductor memory includes a memory array (bank array), a column decoder (column mux), and a current comparison readout circuit (current comparator). A memory cell (bitcell) corresponds to an intersection of a word line (WLs) and a BL in the memory array. The memory arrays are arranged in pairs, namely, Top bank and Bot Bank in FIG. 1. Each memory array corresponds to one column decoder, and each pair of memory arrays corresponds to one current comparison readout circuit. The two memory arrays shown in FIG. 1 each include m+1 WLs and n+1 BLs. Referring to FIG. 2 together, each memory cell includes five ports, including a control gate (CG) and a WL in a transverse direction and a BL, a source line (SL), and a substrate (Sub) in a longitudinal direction.

Figure 3:
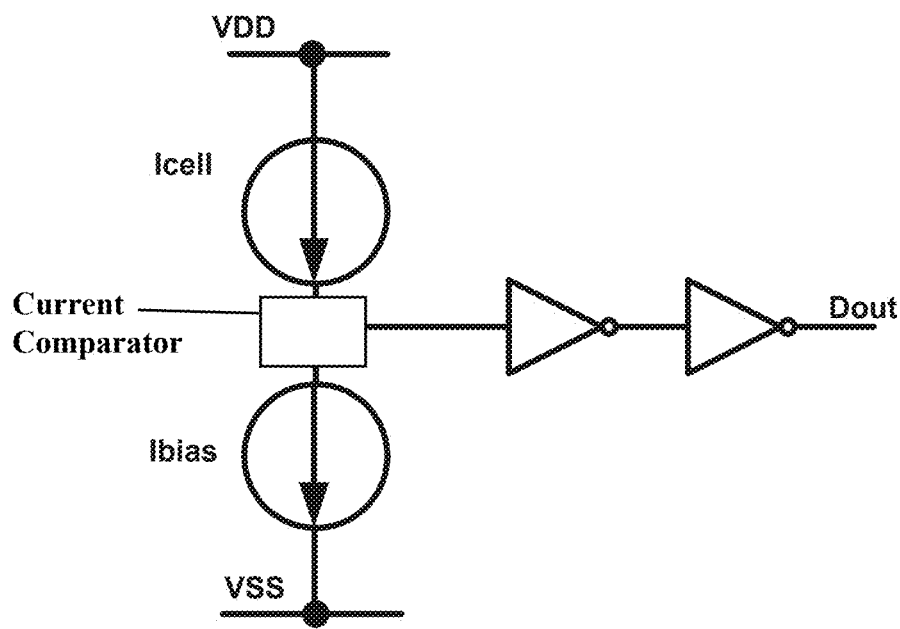
FIG. 3 is a schematic diagram illustrating a current comparison readout circuit according to an embodiment.

FIG. 3 is a schematic diagram illustrating a current comparison readout circuit according to an embodiment. The current comparison readout circuit compares a reference current Ibias with an on current Icell of the memory cell, and then the comparison result is driven by an inverter to output a digital signal Dout. When the memory cell stores data "1", current amplitude of the on current Icell of the memory cell is greater than the reference current Ibias, and the output Dout of the current comparison readout circuit is "1". When the memory cell stores data "0", the current amplitude of the on current Icell of the memory cell is less than the reference current Ibias, and the output Dout of the current comparison readout circuit is "0".

In an example solution, two column decoders shown in FIG. 1 are both enabled when the semiconductor memory performs a read operation. It should be understood that CL refers to current line. Assume that the memory cell corresponding to the intersection of WL0 and Bitline 0 in the top bank is selected by an address (in this case, WL0 is enabled, for example, at a high level), and the on current of the memory cell is transferred to CL_top through Bitline 0 as Icell in FIG. 3. At the same time, Bitline 0 of the bot bank is selected, and is coupled to a reference current port of the current comparison readout circuit through CL_bot. In this way, two currents Icell and Ibias have an identical parasitic load, which can improve the reliability of the current comparison readout circuit.

Figure 4:
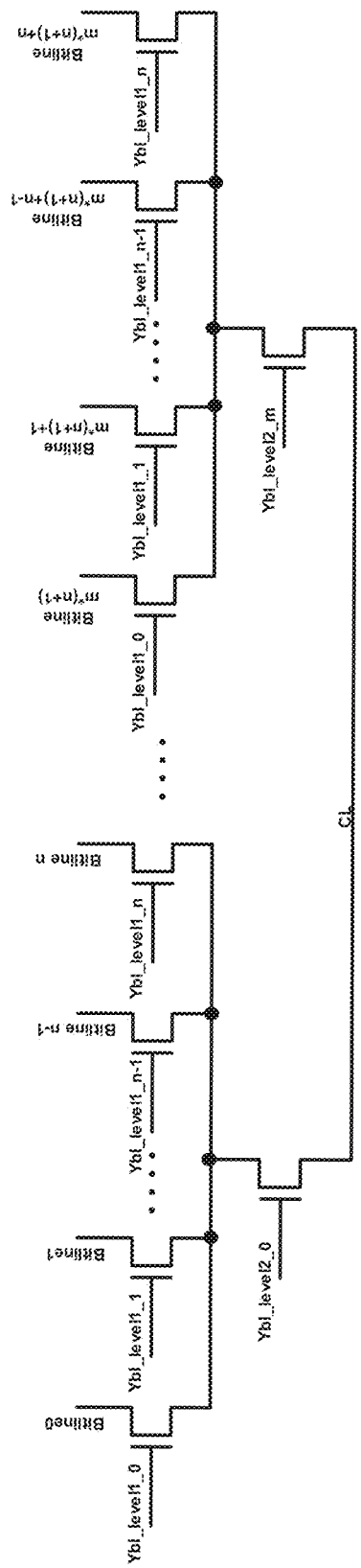
FIG. 4 is a schematic structural diagram illustrating an example column decoder.

FIG. 4 is a schematic structural diagram illustrating an example column decoder. The column decoder serves as a key switch circuit. A first-level switch signal Ybl_level1 is decoded and output by a column selection low-order address, and a second-level switch signal Ybl_level2 is decoded and output by a column selection high-order address. The memory array and the current comparison readout circuit are coupled. For example, in order to maintain channel turn-on characteristics of the column decoder, Ybl_level1/Ybl_level2_selected by the address is generally 2.5 V (a charge pump outputting 2.5 V is generally embedded in the eflash memory). In continuous read operations, the switch signal Ybl_level1/Ybl_level2 in the two column decoders in FIG. 1 is also in a continuous switching state. That is, Ybl_level1/Ybl_level2 corresponding to the selected address is charged from a common ground terminal voltage VSS to 2.5 V, and Ybl_level1/Ybl_level2 corresponding to a previous selected address is discharged from 2.5 V to VSS. The switch signal Ybl_level1/Ybl_level2 is coupled to more MOS devices and has a large wiring parasitic load, and the corresponding Ybl_level1/Ybl_level2 may be charged from VSS to 2.5 V when an address change occurs in the two column decoders. As a result, an output current load of the 2.5 V charge pump is large, resulting in large power consumption of the 2.5 V charge pump during the read operation. Generally, efficiency of the charge pump is shown in Formula (1):

$$(Vpp * Ivpp)/(Vpwr * Ipwr) = \eta \qquad (1)$$

where the efficiency η is generally about 30%, the high level Vpp is 2.5 V, current drive capability Ivpp of the high level is 200 μA, and a power supply voltage Vpwr of the charge pump is 1.5 V, so as to calculate that the current Ipwr of the charge pump is about 1.1 mA. Therefore, the 2.5 V current load is reduced, so as to reduce the power consumption of the 2.5 V charge pump, which is of great practical significance for optimizing the read operation power consumption of the semiconductor memory.

The present application provides a semiconductor memory, including a first memory array and a second memory array, and further including:
  a comparison readout circuit including a first port and a second port, the first port being configured to receive an electrical signal of a read memory cell, the second port being configured to receive a reference electrical signal, the comparison readout circuit being configured to compare the electrical signal of the read memory cell with the reference electrical signal, so as to obtain storage information of the read memory cell;
  a first column decoder coupled to the first memory array and the comparison readout circuit, configured to select a BL corresponding to the read memory cell when a memory array selection signal enables the first memory array, and output the electrical signal of the memory cell to the first port through the BL; and further configured to couple a first BL of the first memory array to the second port when the memory array selection signal does not enable the first memory array; and a second column decoder coupled to the second memory array and the comparison readout circuit, configured to select a BL corresponding to the read memory cell when the memory array selection signal enables the second memory array, and output the electrical signal of the memory cell to the first port through the BL; and further configured to couple a second BL of the second memory array to the second port when the memory array selection signal does not enable the second memory array.

According to the semiconductor memory, when the memory array selection signal does not enable the corresponding memory array, the column decoder couples a particular BL (a first BL for the first memory array and a second BL for the second memory array) of the corresponding memory array to the second port. In this case, the BL corresponding to the read memory cell is coupled to the first port. Therefore, the parasitic load of the first port can match the parasitic load of the second port. Besides, since the BL coupled to the second port is fixed when the memory array selection signal remains disabled (the enabled memory array does not change), the BL coupled to the second port does not change until the column decoder is enabled. Therefore, an increase in the corresponding output load of the column decoder caused by the BL coupled to the second port with frequent changes of the address of the read memory cell when the memory array selection signal is not enabled can be prevented. Thus, the power consumption of the read operation of the semiconductor memory can be correspondingly reduced.

In an embodiment, the comparison readout circuit of the semiconductor memory is a current comparison readout circuit, the first port is configured to receive an on current of the read memory cell, and the second port is configured to receive a reference current. Coupling relationships among the memory arrays, the column decoders, and the current comparison readout circuit of the semiconductor memory may be obtained with reference to FIG. 1. The first memory array and the second memory array are arranged in pairs, so when the first memory array is enabled, the second memory array is in a disabled state; and when the second memory array is enabled, the first memory array is in the disabled state.

The first column decoder and the second column decoder each include an A×B two-level decoder. Values of A and B may be selected according to a number of BLs. For example, if the first memory array/second memory array has 32 BLs, A=4 and B=8. In the embodiment shown in FIG. 5, CL is coupled to the first port of the current comparison readout circuit, the first memory array/second memory array has (m+1)×(n+1) BLs, i.e., Bitline 0 to Bitline m*(n+1)+n, and the two-level decoder includes n+1 first selection switches (coupled to Ybl_level1_0 to Ybl_level1_$n$) and m+1 second selection switches (coupled to Ybl_level2_0 to Ybl_level2_$m$). An input terminal of each second selection switch is coupled to a BL. Each second selection switch is configured to turn on the coupled BL when enabled. The second selection switches are controlled through m+1 (coupled to Ybl_level2_0 to Ybl_level2_$m$) second-level selection signals, and each second-level switch signal controls turn-on of B consecutive address BLs. For example, in FIG. 5, if the second-level switch signal is Ybl_level2_0, the corresponding second selection switch is configured to control Bitline 0 to Bitline n to be turned on. An input terminal of each first selection switch is coupled to output terminals of the m+1 second selection switches. For example, in FIG. 5, if the first-level switch signal is Ybl_level1_0, the corresponding first selection switch is coupled to output terminals of the second selection switches corresponding to Bitline 0, Bitline n+1, Bitline 2 (n+1), . . . , and Bitline m*(n+1). An output terminal of each first selection switch is coupled to the first port of the current comparison readout circuit. The two-level decoder controls turn-on of the n+1 first selection switches through n+1 first-level switch signals (coupled to Ybl_level1_0 to Ybl_level1_$n$) in a one-to-one corresponding manner.

In an embodiment, each of the first selection switches is controlled by column selection address low-order decoding output, and each of the second selection switches is controlled by column selection address high-order decoding output.

Figure 5:
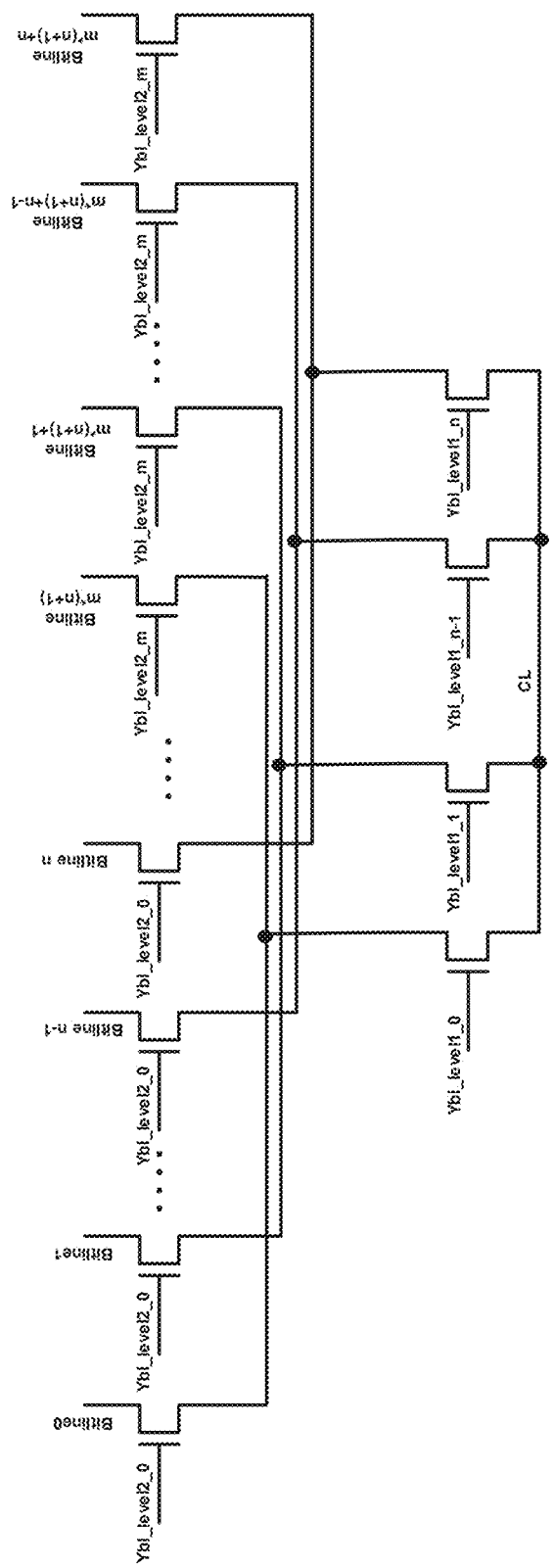
FIG. 5 is a schematic structural diagram illustrating an example column decoder.

The embodiment shown in FIG. 5 is mainly different from FIG. 4 in that, in the embodiment shown in FIG. 5, the column selection address high-order decoding output Ybl_level2_serves as a switch signal coupled to the BL, and the column selection address low-order decoding output Ybl_level1 serves as a switch signal coupled to the CL. An original intention of the optimization method is that the BL is coupled to the memory cell, and the wiring has a large parasitic load. In general, the parasitic load of the BL is much larger than the parasitic load of the CL. Considering that an eflash memory is generally based on continuous address read operations, the switch signal Ybl_level1 changes more frequently than Ybl_level2. In the embodiment shown in FIG. 5, each second-level switch signal Ybl_level2_controls turn-on of n+1 consecutive address BLs. Therefore, in continuous address read operations, the value of the second switch signal Ybl_level2 does not change continuously. Thus, in each read operation, the influence of the large parasitic load of the BL on parasitic capacitive load coupling of the switch signal Ybl_level2 is greatly reduced, and the influence on parasitic capacitive load coupling of the switch signal Ybl_level1 frequently switched is also greatly reduced due to the small parasitic capacitive load of the CL, thereby reducing a current load of an output signal of the 2.5 V charge pump and optimizing power consumption of the charge pump. Based on the above, on the one hand, in each read operation of the semiconductor memory, only the switch signal Ybl_level1/Ybl_level2 of one column decoders in a pair of column decoders corresponding to the address is switched according to the address of the read memory cell, while the other column decoder still keeps the first BL (or the second BL) charged to 2.5 V, thereby reducing an output current load of the 2.5 V charge pump. On the other hand, a capacitive load between the switch signal frequently switched and the BL is reduced. In an embodiment, the current drive capability of the high level can be optimized to 80 μA, the high level Vpp is 2.5 V, the power supply voltage Vpwr of the charge pump is 1.5 V, and η is 30%. It is calculated according to Formula (1) that the current Ipwr of the charge pump is about 0.45 mA, which improves the readout reliability, and reduces the power consumption of the 2.5 V charge pump and optimizes the power consumption of the read operation compared with 0.55 mA in FIG. 4.

In an embodiment, the semiconductor memory further includes a bandgap reference coupled to the second port of the comparison readout circuit. The bandgap reference generates the reference current Ibias. The advantage of using the bandgap reference to generate the reference current Ibias is that the amplitude of the reference current Ibias does not vary with a manufacturing process, temperature, or number of erasings of the memory cell.

Figure 6:
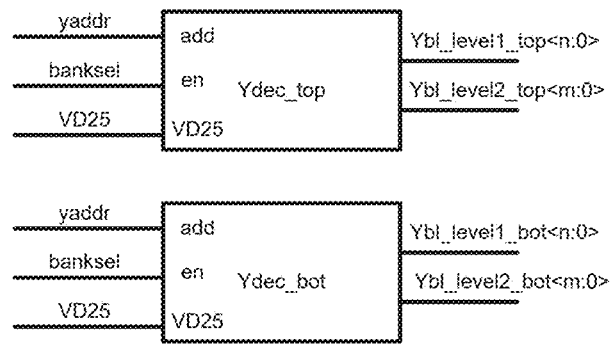
FIG. 6 is a schematic diagram illustrating an address decoder Ydec_top of a first column decoder and an address decoder Ydec_bot of a second column decoder according to an embodiment.

FIG. 6 is a schematic diagram illustrating an address decoder Ydec_top of a first column decoder and an address decoder Ydec_bot of a second column decoder according to an embodiment. The address decoder Ydec_top of the first column decoder includes an address input terminal yaddr, a memory array selection signal input terminal banksel, an operating voltage input terminal VD25, a column selection address low-order decoding terminal Ybl_level1_top<n: 0>, and a column selection address high-order decoding terminal Ybl_level2_top<m: 0>. The address input terminal yaddr is configured to input an address of the read memory cell. The memory array selection signal input terminal banksel is configured to input the memory array selection signal. The operating voltage input terminal VD25 is configured to input an operating voltage, which is a voltage of 2.5 V in this embodiment and is supplied by the charge pump. The column selection address low-order decoding terminal Ybl_level1_top<n: 0> is coupled to the first selection switches of the two-level decoders of the first column decoder, and configured to output a column selection address low-order decoding output signal. The column selection address high-order decoding terminal Ybl_level2_top<m: 0> is coupled to the second selection switches of the two-level decoders of the first column decoder, and configured to output a column selection address high-order decoding output signal. The address decoder Ydec_bot of the second column decoder includes an address input terminal yaddr, a memory array selection signal input terminal banksel, an operating voltage input terminal VD25, a column selection address low-order decoding terminal Ybl_level1_bot<n: 0>, and a column selection address high-order decoding terminal Ybl_level2_bot<m: 0>. The functions of the ports of the address decoder Ydec_bot of the second column decoder are similar to those of the address decoder Ydec_top of the first column decoder which are not repeated herein.

Yaddrd<1:0> outputs a low level, and Yaddrb<1:0> outputs a zero level. In this way, Ybl_level1_int<0> is always at a high level, and passing through the level shifter, Ybl_level1<0> is 2.5 V.

2. In a read operation, when the memory array corresponding to the address is selected, the memory array selection signal corresponding to the memory array is at a high level, the corresponding address decoder decodes and switches output, Ybl_level1 and Ybl_level2 corresponding to the address are charged to 2.5 V, and Ybl_level1<0> and Ybl_level2<0> are discharged from 2.5 V to VSS. The memory array selection signal corresponding to the memory array not selected by the address is still at a low level, and the address decoder corresponding thereto still keeps Ybl_level1<0> and Ybl_level2<0> charged to 2.5 V.

In an embodiment, in a read operation, when the memory cell in the first memory array Top bank is selected by the address, the address decoder Ydec_top decodes and switches output, Ybl_level1_top/Ybl_level2_top corresponding to the address is charged to 2.5 V, and Ybl_level1<0>/Ybl_level2<0> of the first column decoder is discharged from 2.5 V to VSS. The BL in the Top bank selected by the address is coupled to the first port of the current comparison readout circuit. That is, the on current Icell of the memory cell is output to the first port through the BL selected by the address. At the same time, the address decoder Ydec_bot corresponding to the second memory array Bot bank not selected still keeps Ybl_level1_bot<0>/Ybl_level2_bot<0> charged to 2.5 V, and the Bitline 0 is chosen to be coupled to the second port of the current comparison readout circuit, so as to play a role of parasitic load matching.

In the description of the specification, reference terms such as "some embodiments", "other embodiments", and "ideal examples" mean that a particular feature, structure, material, or feature described in connection with the embodiment or example is included in at least one embodiment or example of the present disclosure. In the specifica-

TABLE 1

| Mode | banksel | ybl_level1<0> | ybl_level1<l:n> | ybl_level2<0> | ybl_level2<l:m> |
|---|---|---|---|---|---|
| Standby | 0 | 2.5 | 0 | 2.5 | 0 |
| Read | 0 | 2.5 | 0 | 2.5 | 0 |
|  | 1 |  | decout |  | decout |

Figure 7:
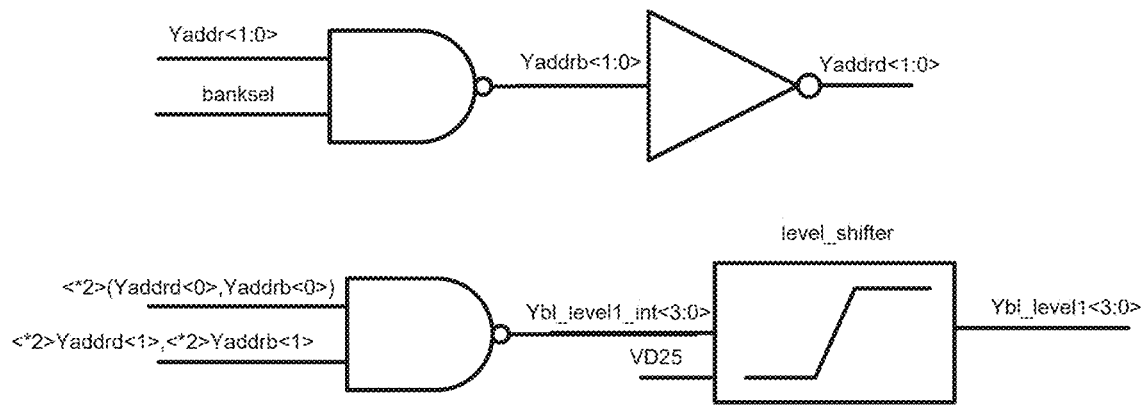
FIG. 7 is a schematic diagram illustrating an internal structure of the address decoder.

Table 1 is a table of function truth values of the address decoders. FIG. 7 is a schematic diagram illustrating an internal structure of the address decoder. In the figure, Yaddrb<1:0> represents a positive logic signal output by Yaddr<1:0> through a first-level inverter, and Yaddrd<1:0> represents a positive logic signal output by Yaddr<1:0> through a two-level inverter. <*2>(Yaddrd<0>, Yaddrb<0>) indicates Yaddrd<0>, Yaddrb<0>, Yaddrd<0>, Yaddrb<0>.

<*2>Yaddrd<1>, <*2>Yaddrb<1> indicates Yaddrd<1>, Yaddrd<1>, Yaddrb<1>, Yaddrb<1>. Ybl_level1_int<3:0> indicates a set of internal signals of a decoding circuit to illustrate how Ybl_level1 is generated, with Ybl_level1_int<3:0> and Ybl_level1<3:0> indicating n=3 in this case. "level shifter" is a level shifting unit configured to convert a voltage of an input signal into another voltage range.

An operating principle of Ydec is described below with Ybl_level1 corresponding to the low-order column address Yaddr<1:0>.

1. In a standby mode, the memory array selection signal input terminal banksel is at a low level. As a result, tion, the schematic expressions to the above terms are not necessarily referring to the same embodiment or example.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the present disclosure. It should be noted that those of ordinary skill in the art may further make variations and improvements without departing from the conception of the present disclosure, and these all fall within the protection scope of the present disclosure. Therefore, the patent protection scope of the present disclosure should be subject to the appended claims.

It should be understood that in some embodiments, the first and second ports are logical assignments. For example, as shown in FIG. 1, when the read memory cell is in the Top Bank the first port of current comparison circuit is coupled to CL_Bot.

What is claimed is:

1. A semiconductor memory, comprising:
   a first memory array including a plurality of memory cells;
   a second memory array including a plurality of memory cells;
   a comparison readout circuit including a first port and a second port, the first port being configured to receive an electrical signal of a read memory cell, the second port being configured to receive a reference electrical signal, the comparison readout circuit being configured to compare the electrical signal of the read memory cell with the reference electrical signal, so as to obtain storage information of the read memory cell;
   a first column decoder coupled to the first memory array and the comparison readout circuit, configured to select a bitline (BL) corresponding to the read memory cell when a memory array selection signal enables the first memory array, and output the electrical signal of the memory cell to the first port through the BL, and further configured to couple a first BL of the first memory array to the second port when the memory array selection signal does not enable the first memory array; and
   a second column decoder coupled to the second memory array and the comparison readout circuit, configured to select a BL corresponding to the read memory cell when the memory array selection signal enables the second memory array, and output the electrical signal of the memory cell to the first port through the BL, and further configured to couple a second BL of the second memory array to the second port when the memory array selection signal does not enable the second memory array wherein
   the first column decoder and the second column decoder each include an A×B two-level decoder, each two-level decoder includes B first selection switches and A second selection switches, an input terminal of each second selection switch is coupled to a BL, each second selection switch is configured to turn on the coupled BL when enabled, each address decoder controls each second selection switch through A second-level switch signals, and each second-level switch signal controls turn-on of B consecutive address BLs;
   an input terminal of each first selection switch is coupled to output terminals of the A second selection switches, an output terminal of each first selection switch is coupled to the first port, and each address decoder controls turn-on of the B first selection switches through B first-level switch signals in a one-to-one corresponding manner; and
   each of the first selection switches is controlled by column selection address low-order decoding output, and each of the second selection switches is controlled by column selection address high-order decoding output.

2. The semiconductor memory according to claim 1, wherein when the first memory array is enabled, the second memory array is in a disabled state, and when the second memory array is enabled, the first memory array is in the disabled state.

3. The semiconductor memory according to claim 1, wherein the first column decoder and the second column decoder each include an address decoder including:
   an address input terminal configured to input an address of the read memory cell;
   a memory array selection signal input terminal configured to input the memory array selection signal;
   an operating voltage input terminal configured to input an operating voltage;
   a column selection address low-order decoding terminal coupled to each of the first selection switches and configured to output a column selection address low-order decoding output signal; and
   a column selection address high-order decoding terminal coupled to each of the second selection switches and configured to output a column selection address high-order decoding output signal.

4. The semiconductor memory according to claim 3, wherein in a standby mode and when the memory array selection signal does not enable the first memory array, the memory array selection signal input by the memory array selection signal input terminal of the first column decoder is 0, and the column selection address low-order decoding terminal and the column selection address high-order decoding terminal of the first column decoder output corresponding high-level signals as the first-level switch signal and the second-level switch signal to control the first selection switch and the second selection switch corresponding to the first BL to be turned on, so as to couple the first BL of the first memory array to the second port; and
   wherein in the standby mode and when the memory array selection signal does not enable the second memory array, the memory array selection signal input by the memory array selection signal input terminal of the second column decoder is 0, and the column selection address low-order decoding terminal and the column selection address high-order decoding terminal of the second column decoder output corresponding high-level signals as the first-level switch signal and the second-level switch signal to control the first selection switch and the second selection switch corresponding to the second BL to be turned on, so as to couple the second BL of the second memory array to the second port.

5. The semiconductor memory according to claim 3, wherein the operating voltage is 2.5 V.

6. The semiconductor memory according to claim 5, wherein the semiconductor memory further includes a charge pump, and the operating voltage is supplied by the charge pump.

7. The semiconductor memory according to claim 6, wherein the high-level signals output by the column selection address low-order decoding terminal and the column selection address high-order decoding terminal of each address decoder are 2.5 V signals supplied by the charge pump.

8. The semiconductor memory according to claim 1, wherein the comparison readout circuit is a current comparison readout circuit, the electrical signal of the read memory cell is an on current of the memory cell, and the reference electrical signal is a reference current.

9. The semiconductor memory according to claim 8, further comprising a bandgap reference coupled to the second port and configured to generate the reference current.

10. The semiconductor memory according to claim 8, wherein when the memory cell stores data "1", the on current is greater than the reference current, and the current comparison readout circuit outputs "1", and wherein when the memory cell stores data "0", the on current is less than the reference current, and the current comparison readout circuit outputs "0".

11. The semiconductor memory according to claim 1, wherein each of the memory cells includes four ports: a word line, a BL, a source line, and a substrate.

12. The semiconductor memory according to claim 1, wherein the semiconductor memory is a flash memory.

13. The semiconductor memory according to claim 12, wherein the semiconductor memory is an embedded flash memory.

* * * * *